US012692443B2

(12) United States Patent　　　　(10) Patent No.:　US 12,692,443 B2

Cui et al.　　　　　　　　　　　　(45) Date of Patent:　　Jul. 28, 2026

---

(54) FULLY MODULARIZED MID-FEED PYROLYSIS REACTOR WITH SIMULTANEOUS MULTI-FEED CAPABILITIES

(71) Applicant: HARVESTGREEN 4H2 INC., Ottawa (CA)

(72) Inventors: Maopei Cui, Ottawa (CA); Xiaoxia Li, Xuzhou City (CN)

(73) Assignee: HARVESTGREEN 4H2 INC. (CA)

( * ) Notice: Subject to any disclaimer, the term of this patent is extended or adjusted under 35 U.S.C. 154(b) by 132 days.

(21) Appl. No.: 18/775,375

(22) Filed: Jul. 17, 2024

(65) Prior Publication Data

US 2025/0313755 A1　　Oct. 9, 2025

(30) Foreign Application Priority Data

Apr. 3, 2024　(CN) ......................... 202410401397.9
Apr. 3, 2024　(CN) ......................... 202420680594.4

(51) Int. Cl.
　　*C10B 31/02*　　　(2006.01)
　　*B01J 6/00*　　　(2006.01)
　　　　　　(Continued)

(52) U.S. Cl.
　　CPC ................. *C10B 7/10* (2013.01); *B01J 6/008* (2013.01); *C10B 3/00* (2013.01); *C10B 31/02* (2013.01);
　　　　　　(Continued)

(58) Field of Classification Search
　　CPC ......... C10B 49/02; C10B 49/04; C10B 49/06; C10B 1/04; C10J 3/20–44; C10J 3/52–526; F23K 2203/202; F23B 1/24
　　See application file for complete search history.

(56) References Cited

U.S. PATENT DOCUMENTS 947,065　A　*　1/1910　Swindell et al. .......... C10J 3/30
　　　　　　　　　　　　　　　　　　　122/5
1,341,044　A　*　5/1920　Chapman ................... C10J 3/32
　　　　　　　　　　　　　　　　　　　48/85.1

(Continued)

FOREIGN PATENT DOCUMENTS

CN　　　112680239　A　*　4/2021

OTHER PUBLICATIONS

Espacenet translation of CN-112680239-A.*

*Primary Examiner* — Jonathan Luke Pilcher
(74) *Attorney, Agent, or Firm* — Emerson, Thomson & Bennett, LLC; Roger D. Emerson; Peter R. Detorre

(57)　　　　　　ABSTRACT

A fully modular assembled pyrolysis reactor with multiple feeding points includes modular upper and lower vessels. The lower vessel is equipped with a first biomass input unit, and inside the lower vessel, there is an integrated rotatable grate. The outlet end of the input pipe of the first biomass input device is formed at the top center of the grate, so that the grate's surface forms the core reaction zone of the pyrolysis reactor. The upper vessel is equipped with additional biomass input units, and the outlet end of the input pipe of the additional biomass input units extend into the core reaction zone of the pyrolysis reactor, with built-in cooling function and door switch. While achieving precise control, the technical problem of single feedstock in existing vertical pyrolysis reactor with bottom feeding is solved, and the use of multiple feedstocks can be immediately implemented, greatly improving operational stability.

6 Claims, 2 Drawing Sheets

(51) Int. Cl.
| | |
|---|---|
| *C10B 3/00* | (2006.01) |
| *C10B 7/10* | (2006.01) |
| *C10B 31/06* | (2006.01) |
| *C10B 33/00* | (2006.01) |
| *C10B 53/02* | (2006.01) |

(52) U.S. Cl.
CPC .............. *C10B 31/06* (2013.01); *C10B 33/00* (2013.01); *C10B 53/02* (2013.01)

(56) References Cited

U.S. PATENT DOCUMENTS

| | | | | |
|---|---|---|---|---|
| 1,722,495 A * | 7/1929 | Chapman | ................ | F23B 90/06 122/5 |
| 1,857,354 A * | 5/1932 | Chapman | ................. | F23K 3/14 110/287 |
| 1,866,730 A * | 7/1932 | Sperr, Jr. | .................. | C10B 1/04 201/38 |
| 1,888,585 A * | 11/1932 | Chapman | ................. | F23K 3/14 110/313 |
| 1,888,586 A * | 11/1932 | Chapman | .................. | C10J 3/32 74/411 |
| 1,918,739 A * | 7/1933 | Chapman | ................. | C10B 1/04 202/254 |
| 2,143,017 A * | 1/1939 | Koppers | ................... | C10J 3/00 48/68 |
| 4,014,664 A * | 3/1977 | Kupfer | ...................... | C10J 3/42 48/68 |
| 4,225,392 A * | 9/1980 | Taylor | ...................... | C10B 1/04 48/85 |
| 4,388,876 A * | 6/1983 | Burton | ...................... | F23J 1/00 110/247 |
| 4,971,599 A * | 11/1990 | Cordell | .................... | F23K 3/14 110/214 |
| 4,987,115 A * | 1/1991 | Michel-Kim | .............. | C10J 3/34 48/197 R |
| 5,089,030 A * | 2/1992 | Michel-Kim | .............. | C10J 3/02 48/85.1 |
| 5,138,957 A * | 8/1992 | Morey | ...................... | F23K 3/14 48/209 |
| 7,241,322 B2 * | 7/2007 | Graham | ................... | F23G 5/24 48/209 |
| 8,001,912 B2 * | 8/2011 | Graham | ................... | F23G 5/50 110/210 |
| 8,317,886 B2 * | 11/2012 | Graham | ................... | C10J 3/723 48/74 |
| 8,882,493 B2 * | 11/2014 | Vandergriendt | ........ | F23D 23/00 431/278 |
| 9,790,443 B2 * | 10/2017 | Cui | ............................ | C10J 3/30 |
| 9,951,957 B2 * | 4/2018 | Park | ...................... | F24B 13/02 |
| 2007/0266914 A1 * | 11/2007 | Graham | ................. | F23G 5/027 110/341 |
| 2010/0313796 A1 * | 12/2010 | Graham | ................. | F23G 5/027 110/229 |
| 2012/0137582 A1 * | 6/2012 | Graham | .................... | C10J 3/34 48/197 R |
| 2016/0068757 A1 | 3/2016 | Cui et al. | | |
| 2018/0306435 A1 * | 10/2018 | Na | ......................... | F23B 30/00 |
| 2024/0240788 A1 * | 7/2024 | Jones | ...................... | C10B 53/02 |
| 2025/0313766 A1 * | 10/2025 | Cui | ......................... | C10B 53/02 |
| 2025/0313767 A1 * | 10/2025 | Cui | ......................... | C10B 53/02 |

* cited by examiner

FULLY MODULARIZED MID-FEED PYROLYSIS REACTOR WITH SIMULTANEOUS MULTI-FEED CAPABILITIES

TECHNICAL FIELD

The present invention relates to the field of energy, particularly renewable bioenergy, and more particularly to a fully modularized mid-feed pyrolysis reactor with simultaneous multi-feed capabilities.

BACKGROUND ART

Biomass pyrolysis refers to the thermochemical conversion technology method in which biomass is heated to 250~700° C. in the absence of oxidants (air, oxygen, water vapor, etc.) or with limited oxygen, and large molecular biomass substances (lignin, cellulose, and hemicellulose) are decomposed into smaller molecular fuel substances (solid charcoal, combustible gas, bio-oil) through thermochemical reactions. From the perspective of chemical reactions, complex thermochemical reactions occur in biomass during pyrolysis, including molecular bond breaking, isomerization, and small molecule polymerization reactions. (Zhao Tinglin, Wang Peng, Deng Dajun, et al. Current situation and prospects of biomass pyrolysis[J]. New Energy Industry, 2007, 5:54-60).

The products of biomass pyrolysis are combustible pyrolysis gas and solid biomass charcoal, both of which are products that can be used for energy applications. In addition to being used as heating fuel, pyrolysis gas can also be further reformed as raw materials for power generation and synthesizing green liquid fuels; biomass charcoal has many additional values besides being used as fuel, and is also used as fuel for metal smelting, food and light industry, reducing agent for electric furnace smelting, and covering agent to protect metals from oxidation during metal refining. It is also used as raw material for chemical industry products such as carbon disulfide and activated carbon. Since the Chinese government prohibits the use of wood to make charcoal, the market for biomass charcoal is vast.

Chinese Patent CN201210590914.9 discloses a vertical pyrolysis reactor. The reactor includes a reactor vessel, a feeding device, a biomass gas outlet at the top of the reactor, an ash discharge device at the bottom of the reactor, and a grate inside the reactor. The feeding device is located at the bottom of the reactor, and the outlet of the feeding device is located at the bottom center of the reactor.

Application number CN201220748018.6, Patent Title: A precise control vertical pyrolysis reactor, including a reactor vessel, a feeding device, a biomass gas outlet at the top of the reactor, an ash discharge device at the bottom of the reactor, and a grate inside the reactor. The feeding device is located at the bottom of the reactor, and the outlet of the feeding device is located at the bottom center of the reactor. By adopting a bottom-center feeding method, the problem of uniform feeding, which has long plagued biomass pyrolysis reactors, is solved; a slag breaking device is installed in the pyrolysis reactor and organically combined with the rotating grate. The operating speed of the grate can be precisely adjusted to control the discharge amount. By controlling the feeding speed, discharge speed, bed thickness, air intake volume, air distribution, reaction temperature, etc., precise pyrolysis reaction control is achieved. The slag discharge of the pyrolysis reactor is more stable and continuous, and the production reliability is greatly improved; the position design of the feeding device and the coordinated use of the slag breaking device can effectively continuously process biomass of up to about 10 cm in size.

CN202011483354.8, Patent Title: A rotary disc and pyrolysis reactor, including a disc body and at least one stirring piece, wherein the disc body is configured to be rotatably mounted, and a stirring piece is arranged on the disc body's stirring surface; the stirring piece is configured to be fixedly mounted, and the disc body can rotate freely relative to the stirring piece. When the reactor of the invention is in operation, the stirring piece and the ash stirring piece simultaneously act on the material and the accumulated ash, making it difficult for bridging phenomena to occur inside the reactor. The stirring piece of this application has a flow channel, and its interior is cooled by a cooling medium. Heat exchange between the cooling medium and the material and gas inside the reactor can effectively reduce the temperature inside the reactor, thereby effectively controlling the degree of coking inside the reactor and avoiding the formation of coking.

There is a need for an improved reactor that overcomes at least some of the disadvantage of the prior art reactors.

SUMMARY OF EMBODIMENTS

To solve the technical problem of single feedstock in the vertical pyrolysis reactor with bottom feeding in the existing technology, the present application proposes a fully modular assembled pyrolysis reactor capable of simultaneous feeding at multiple locations, thereby solving the above-mentioned technical problem.

The technical solution adopted by the present invention to solve the technical problem is as follows:

The present invention provides a fully modular assembled pyrolysis reactor capable of simultaneous feeding at multiple locations, comprising: a lower vessel, wherein the lower vessel is equipped with a first biomass input unit, and the lower vessel is integrated with a rotatable grate; the outlet end of the input pipe of the first biomass input unit is formed at the top center of the grate, so that the surface of the grate forms the core reaction zone of the pyrolysis reactor; a modular upper vessel, comprising a first portion and a second portion which is also referred to as a middle vessel, wherein the middle vessel is equipped with one or more second biomass input units, and the outlet end of the input pipe of the one or more second biomass input units extend into the core reaction zone of the pyrolysis reactor.

Furthermore, both the input pipes of the first biomass input unit and the one or more second biomass input units are equipped with screws for conveying biomass.

Furthermore, the input pipe of the one or more second biomass input units are provided with a heat insulation structure layer in a section inside the lower vessel.

Furthermore, the heat insulation structure layer is covered with insulating material, or the heat insulation structure layer is a circulating water-cooling or air-cooling layer.

Furthermore, the top center of the grate is equipped with a material distribution tower with a pointed apex and a bowl-shaped structure, the material distribution tower covers the outlet end of the input pipe of the first biomass input unit, and ensures that the biomass input from the one or more second biomass input units fall uniformly onto the bottom surface of the grate, ensuring uniform progress of the pyrolysis reaction.

Furthermore, the outlet end of the input pipe of the one or more second biomass input unit is equipped with a valve that automatically closes under the action of gravity, which allows immediate input or immediate stop.

Furthermore, multiple mutually connected water-cooling pipes are connected inside the lower vessel, the water-cooling pipes are fixed inside the lower vessel, and the water-cooling pipes are arranged above the surface of the grate to agitate and stir the biomass materials on the grate.

Furthermore, it further includes a modular ash/char discharge seat that can be integrally integrated with the lower vessel, the ash/char discharge seat is detachably disposed at the bottom of the lower vessel, and the bottom of the surface of the grate is formed with a circular strip-shaped ash/char discharge port at the inner wall of the lower vessel, and the waste residue after the reaction enters the ash/char discharge seat through the ash/char discharge port.

Furthermore, the connection between the upper vessel, the lower vessel, and the ash/char discharge seat respectively corresponds to a circular ring, so as to achieve modular assembly with any orientation adjustment in the direction horizontally.

Based on the above technical solution, the technical effects that the present invention can achieve are as follows:

The fully modular assembled pyrolysis reactor capable of simultaneous feeding at multiple locations of the present invention is equipped with a first biomass input unit on the lower vessel and one or more second biomass input units on the middle vessel, which can input at least two kinds of biomass simultaneously, and the amount of biomass input and the capacity of the reactor can be larger, about 4-10 times the capacity of a single feed reactor. At the same time, the fully modular assembled pyrolysis reactor capable of simultaneous feeding at multiple locations of the present invention can be modularly manufactured. It can be pre-installed by professional technicians including electrical and monitoring systems in the workshop of the reactor manufacturer and undergo comprehensive cold and hot commissioning, and then modularly transported to the site, avoiding rough installation by non-professional construction personnel at the installation site, shortening 90% of the on-site installation time while ensuring installation quality. In short, modular design not only maximizes the commercial level but also achieves precise control of the pyrolysis reaction.

The fully modular assembled pyrolysis reactor capable of simultaneous feeding at multiple locations of the present invention, the connections between the upper vessel, the lower vessel, and the ash/char discharge seat respectively correspond to circular ring fits, so as to achieve modular assembly with arbitrary direction adjustment in the horizontal direction. The main modular split equipment of the pyrolysis reactor can be like building blocks, with arbitrary combination directions such as feeding, air intake, ash/char discharge, and gas discharge, to meet various usage requirements of customers, without the need to change the overall design of the pyrolysis reactor itself.

1—Lower vessel, 11—First biomass input unit, 12—Grate, 13—Material distribution tower, 14—Water cooling pipeline; 2—Upper vessel, 2a—first portion of upper vessel, 2b—second portion of upper vessel also referred to as middle vessel, 21—One or more Second biomass input units, 22—Valve; 3—Ash/char discharge seat, 31—Ash/char discharge port.

DETAILED DESCRIPTION OF EMBODIMENTS

The following detailed description of the embodiments of the present invention, in conjunction with the accompanying drawings, describes the technical solutions in the embodiments of the present invention clearly and completely. It is evident that the described embodiments are only a part of the embodiments of the present invention, not all embodiments. The description of at least one exemplary embodiment is illustrative only and is not to be construed as limiting the scope of the present invention. All other embodiments obtained by a person skilled in the art without creative work based on the embodiments of the present invention are within the scope of the present invention.

Figure 1:
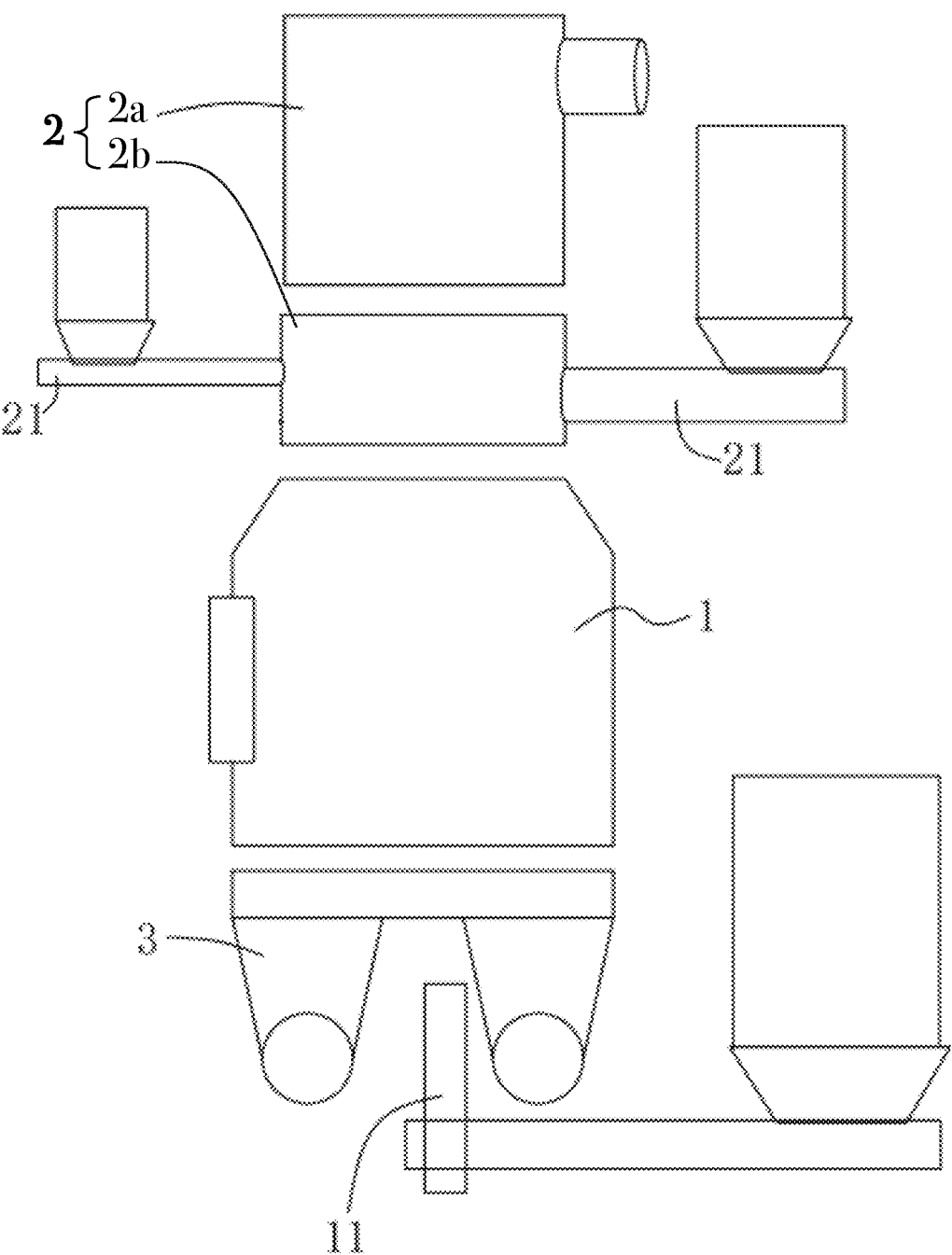
FIG. 1 shows a schematic diagram of the fully modularized, multi-feed, simultaneous pyrolysis reactor of the present invention.
Figure 2:
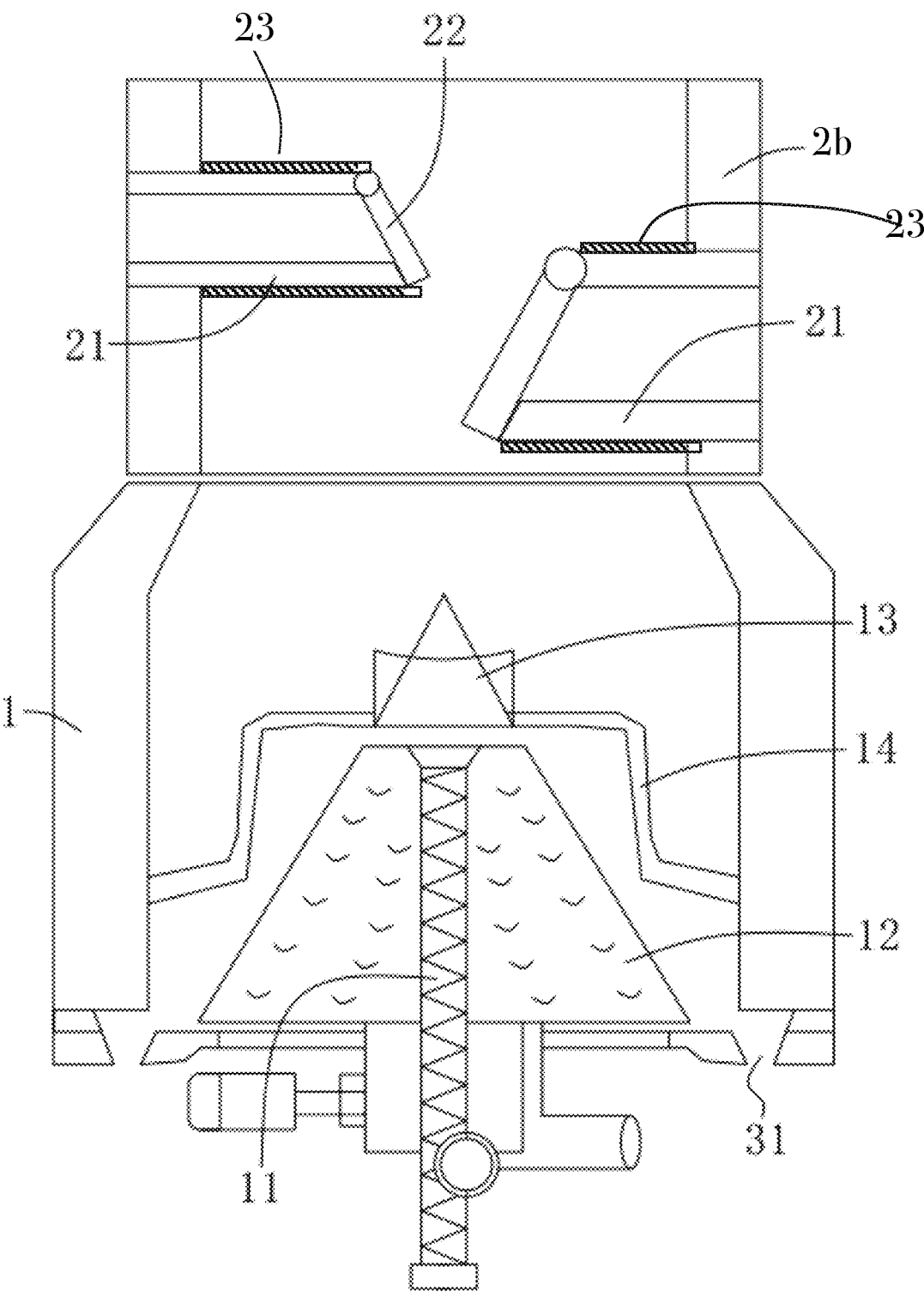
FIG. 2 illustrates the internal structure of the upper and lower vessels of the fully modularized, multi-feed, simultaneous pyrolysis reactor of the present invention.

As shown in FIGS. 1-2, the present invention provides a fully modularized, multi-feed, simultaneous pyrolysis reactor, including lower vessel 1 and upper vessel 2. The lower vessel 1 is equipped with a first biomass input unit 11, and at the same time, a rotatable grate 12 is integrally integrated inside the lower vessel 1. The outlet end of the input pipe of the first biomass input unit 11 is located at the top center of the grate 12, so that the surface of the grate 12 forms the core reaction zone of the pyrolysis reactor. The upper vessel 2 is split into a first portion 2a and a second portion 2b, which is also referred to as middle vessel 2b. The middle vessel 2b is equipped with one or more second biomass input units 21, and the outlet end of the input pipe of the one or more second biomass input units 21 extend into the core reaction zone of the pyrolysis reactor.

The first biomass input unit 11 can input dried sludge particles. Due to the instability of the calorific value of dried sludge sometimes, when the calorific value is low, the pyrolysis reaction may become unstable. At this time, the control system of the pyrolysis reactor will determine that higher calorific value fuel is needed. Therefore, the second biomass input unit 21 can input high-calorific-value dried wood chips according to the calculation results of the control system. The input, automatic input, and control of the amount and rate of biomass input can be achieved through the control system, realizing stable and precise control of the biomass pyrolysis reactor.

When the second biomass feedstock is not needed to be input, the input can be stopped immediately. When the input is stopped, the heat insulation layer and the valve 22 can protect the pyrolysis reactor from affecting the second feedstock still in the input unit.

The second biomass feedstock can be organic solid waste, such as PE plastic pieces, RDF, etc. Due to the small quantity, it needs to react after being mixed with the primary biomass feedstock.

The fully modularized, multi-feed, simultaneous pyrolysis reactor of the present invention can simultaneously input at least two kinds of biomass feedstock. The amount of input biomass and the capacity of the reactor can also be increased, about 4-10 times the capacity of a single-feed reactor. Moreover, the fully modularized, multi-feed, simultaneous pyrolysis reactor of the present invention can be modularly manufactured. It can be pre-installed with electrical and monitoring systems by professional technicians in the workshop of the reactor manufacturer and undergo comprehensive cold and hot debugging. Then, it can be modularly transported to the site to avoid rough installation by non-professional construction personnel at the work site, shorten 90% of the on-site installation time, and ensure the installation quality. Modular installation also ensures that the angles of feeding, air intake, ash/char discharge, gas discharge, etc., can be adjusted at any time. Under the standardization of various modular equipment, the angles of various installations can be adjusted like building blocks to meet the on-site requirements of customers without changing the overall design of the pyrolyzer. In summary, modular design not only maximizes commercialization but also achieves precise control of pyrolysis reactions.

In a specific embodiment of the present invention, both the first biomass input unit 11 and the one or more second biomass input units 21 are equipped with screws for transporting biomass inside the input pipe.

In a specific embodiment of the present invention, a heat insulation layer 23 is provided on a section of the input pipe of the second biomass input unit 21 inside the middle vessel 2b.

Specifically, the heat insulation layer 23 is an insulation material coating, or the heat insulation layer 23 is a circulating water-cooling or air-cooling layer.

In a specific embodiment of the present invention, the top center of the grate 12 is equipped with a material distribution tower 13 with a pointed top and a bowl-shaped structure. The material distribution tower 13 shields the outlet end of the input pipe of the first biomass input unit 11 to prevent the biomass input from the one or more second biomass input units 21 on the middle vessel 2b from entering the input pipe of the first biomass input unit 11 on the lower vessel 1. It ensures that the biomass input from the second biomass input unit 21 eventually falls uniformly onto the surface of the grate 12 below, ensuring uniform pyrolysis reaction.

In a specific embodiment of the present invention, the outlet end of the input pipe of the one or more second biomass input units 21 are equipped with a valve 22 that automatically closes under the action of gravity. For example, the outlet end of the input pipe of the second biomass input unit 21 is designed to protrude downward obliquely. When the input pipe no longer feeds, the valve 22 will automatically press against the protruding outlet end under the action of gravity.

In an alternative embodiment of the present invention, the upper vessel 2 can be a monolithic structure.

In a specific embodiment of the present invention, the lower vessel 1 is connected with multiple interconnected water-cooling pipelines 14 inside, the water cooling pipelines 14 are fixed inside the lower vessel 1, and the water cooling pipelines 14 are arranged above the surface of the grate 12 to stir and agitate the biomass on the surface of the grate 12, preventing the biomass from arching and/or agglomeration on the surface.

In a specific embodiment of the present invention, the fully modularized, multi-feed, simultaneous pyrolysis reactor further includes a modular ash/char discharge seat 3 that can be integrated with the lower vessel 1. The ash/char discharge seat 3 can be detachably arranged at the bottom of the lower vessel 1. At the same time, the bottom of the surface of the grate 12 is formed with a circular ash/char discharge port 31 at the inner wall of the lower vessel 1, and the waste residue after the reaction enters the ash/char discharge seat 3 through the ash/char discharge port 31.

The fully modularized, multi-feed, simultaneous pyrolysis reactor of the present invention, the upper vessel 2, the lower vessel 1, and the ash/char discharge seat 3 all correspond to circular ring matches, so as to achieve modular assembly with any direction adjustment in the horizontal direction. The main modular split equipment of the pyrolysis reactor can be assembled in any combination direction like building blocks, such as feeding, air intake, ash/char discharge, gas discharge, etc., to meet various usage requirements of customers without changing the overall design of the pyrolyzer itself.

It should be understood that the specific embodiments described above are only used to explain the present invention and are not intended to limit the present invention. Obvious changes or modifications derived from the spirit of the present utility model are still within the protection scope of the present utility model.

What is claimed is:

1. A modular pyrolysis reactor having multiple simultaneous feeds, comprising:
a lower vessel configured for receiving a first biomass material from a first biomass input unit, wherein a truncated cone-shaped rotatable grate is disposed in the lower vessel, and an outlet end of an input pipe of the first biomass input unit is formed at a center of a top of the rotatable grate, so that a side surface of the rotatable grate forms a core reaction zone of the pyrolysis reactor, and wherein a material distribution tower having a pointed apex and a bowl structure is disposed above the top of the rotatable grate, the pointed apex covering the outlet end of the input pipe of the first biomass input unit and having a base that extends radially outwardly substantially to an outer edge of the top of the rotatable grate;
an upper vessel; and
a middle vessel disposed between the lower vessel and the upper vessel, the middle vessel configured for receiving at least a second biomass material from at least one second biomass input unit, wherein an outlet end of an input pipe of the at least one second biomass input unit extends radially inward to a central region of the pyrolysis reactor that is substantially vertically above the pointed apex and bowl structure of the material distribution tower, and wherein the outlet end of the input pipe of the at least one second biomass input unit is provided with a valve which automatically closes under gravity.

2. The pyrolysis reactor having multiple simultaneous feeds according to claim 1, wherein the input pipes of the first biomass input unit and of the at least one second biomass input unit are each internally provided with a screw for conveying a biomass.

3. The pyrolysis reactor having multiple simultaneous feeds according to claim 1, wherein the input pipe of the at least one second biomass input unit is provided with a heat insulation layer on a section thereof disposed inside the middle vessel.

4. The pyrolysis reactor having multiple simultaneous feeds according to claim 3, wherein the heat insulation layer is an insulating material coating, or the heat insulation layer is a circulating water-cooling layer.

5. The pyrolysis reactor having multiple simultaneous feeds according to claim 1, wherein a plurality of water-cooling pipes communicating with each other are connected in the lower vessel, the water-cooling pipes are fixed in the lower vessel, and the water-cooling pipes are arranged above the surface of the rotatable grate to stir and mix a biomass on the grate.

6. The pyrolysis reactor having multiple simultaneous feeds according to claim 1, further comprising a modular ash/char discharge seat disposed within the lower vessel, wherein the ash/char discharge seat is detachably arranged at a bottom of the lower vessel, circular strip-shaped ash/char discharge ports are formed at a bottom of the surface of the grate and the inner wall of the lower vessel, and waste ash/char after completion of the reaction enters the ash/char discharge seat through the ash/char discharge ports.

\* \* \* \* \*